United States Patent [19]
Saito et al.

[11] Patent Number: 5,267,279
[45] Date of Patent: Nov. 30, 1993

[54] METHOD AND STRUCTURE FOR REPAIRING AN ELONGATED METAL HOLLOW MEMBER

[75] Inventors: Hideyo Saito; Koichi Kurosawa; Takayuki Numata, all of Hitachi; Shigeo Hattori, Ibaraki; Takenori Shindo, Kure, all of Japan

[73] Assignees: Hitachi, Ltd., Tokyo; Babcock-Hitachi Kabushiki Kaisha, Ibaraki, both of Japan

[21] Appl. No.: 639,069

[22] Filed: Jan. 9, 1991

[30] Foreign Application Priority Data

Jan. 12, 1990 [JP] Japan ................... 2-003573

[51] Int. Cl.$^5$ .......................................... G21C 19/00
[52] U.S. Cl. .................................... 376/260; 138/97
[58] Field of Search ................ 376/260; 228/126, 133, 228/134, 107; 138/97, 98, 99; 285/397, 398

[56] References Cited

U.S. PATENT DOCUMENTS 4,847,967  7/1989  Gaudin .............................. 376/260
5,103,173  4/1992  Honkura et al. .................... 324/239

FOREIGN PATENT DOCUMENTS 56-82696  5/1981  Japan .
63-45593  2/1988  Japan .
63-28124  9/1988  Japan .

*Primary Examiner*—Donald P. Walsh
*Assistant Examiner*—Frederick H. Voss
*Attorney, Agent, or Firm*—Antonelli, Terry, Stout & Kraus

[57] ABSTRACT

A part of an ICM housing including a portion to be repaired, welded to a wall of a reactor pressure vessel in operation, is cut and removed and a new ICM housing half is welded to the remaining part of the ICM housing to form a new ICM housing. The new ICM housing is provided at the welding portion thereof with a molten metal layer containing 4 wt % or more δ ferrite. A sleeve made of stainless steel is located at the welding portion of an inner peripheral surface of the new ICM housing made so as to be molten by a TIG welding machine to form the molten metal layer, with the molten metal layer preventing stress corrosion cracking of the new ICM housing.

8 Claims, 10 Drawing Sheets

METHOD AND STRUCTURE FOR REPAIRING AN ELONGATED METAL HOLLOW MEMBER

FIELD OF THE INVENTION

The present invention relates to a method and a structure for repairing an elongated metal hollow member which is welded to a reactor pressure vessel (RPV) in operation, and more particularly, to a repairing method and a structure therefor which are capable of preventing occurrence of any stress corrosion cracking in a weld of a metal hollow member during operation, which cracking allows a coolant to leak out of the RPV.

BACKGROUND OF THE INVENTION

Examples of this kind of hollow member include a housing for an incore monitor (ICM) which serves to monitor the neutron flux generating in the RPV, and a housing for a control-rod drive (CRD) which serves to drive the control rod.

The hollow member, e.g. the ICM housing, extends through a wall of the RPV into the coolant while it is welded to the wall of the RPV through a cladding weld formed on an inner surface of the RPV wall. Such ICM housing is made of TYPE 304 stainless steel. In general, a welding residual stress exists in the weld as a result of the welding heat input. Under the presence of the welding residual stress, corrosion proceeds markedly at the weld of the ICM housing in the coolant, resulting in cracking. This phenomenon is referred to as the stress corrosion cracking. Upon the occurrence of the stress corrosion cracking in the weld of the ICM housing, there is the possibility that the coolant leaks out of the RPV.

Once the stress corrosion cracking has occurred, repair may be conducted by a known method in which a shielding member is welded to the hollow member to surround the stress corrosion cracked portion as disclosed in JP-U-56-82696. On the contrary, as disclosed in JP-A-2-128195, an ICM housing lower half including a part thereof in which the stress corrosion cracking has occurred is cut and removed to replace it with a new ICM housing half welded to the remaining housing half.

However, these repairing methods will make another new weld which presents a danger of stress corrosion cracking.

SUMMARY OF THE INVENTION

An object of the present invention is to provide a repairing method and a structure therefor which are capable of preventing occurrence of any stress corrosion cracking in a metal hollow member in an RPV.

To this end, according to one aspect of the present invention, there is provided a method for repairing an elongated metal hollow member which is welded to a wall of a pressure vessel of a nuclear reactor and extends into a coolant within said pressure vessel, said method comprising the steps of removing said coolant out of said hollow member, cutting and removing a part of the hollow member, including a portion to be repaired, welding a new hollow member element with a remaining part of the hollow member into a new hollow member through a weld. An inner peripheral surface of a wall portion of the new hollow member including the weld is smoothed, and a metal sleeve is located on the inner peripheral surface of the wall portion in a coaxial relationship therewith. The metal sleeve is fitted onto the inner peripheral surface of the wall portion along an entire length of the metal sleeve, and the metal sleeve is heated throughout to provide a δ ferrite molten metal portion penetrating into both the wall portion and the metal sleeve.

Further, according to another aspect of the present invention, there is provided a repairing structure of a part of an elongated metal hollow member, including a portion to be repaired, welded to a wall of a pressure vessel of a nuclear reactor, with the metal hollow member extending into a coolant within the pressure vessel. The structure comprises a molten metal portion at a portion of inner peripheral surface of a remaining part of the hollow member excluding the portion to be repaired and of a part of another hollow member, which members are welded together into a new hollow member through a weld. At the weld, the molten metal portion penetrates into both a wall portion of the new hollow member and of a metal sleeve, including δ ferrite, disposed on the inner peripheral surfaces.

Other objects, functions and effects of the present invention will become more clear from the description of preferred embodiments to be described below in detail with reference to the accompanying drawings.

DETAILED DESCRIPTION OF PREFERRED EMBODIMENTS

Figure 1:
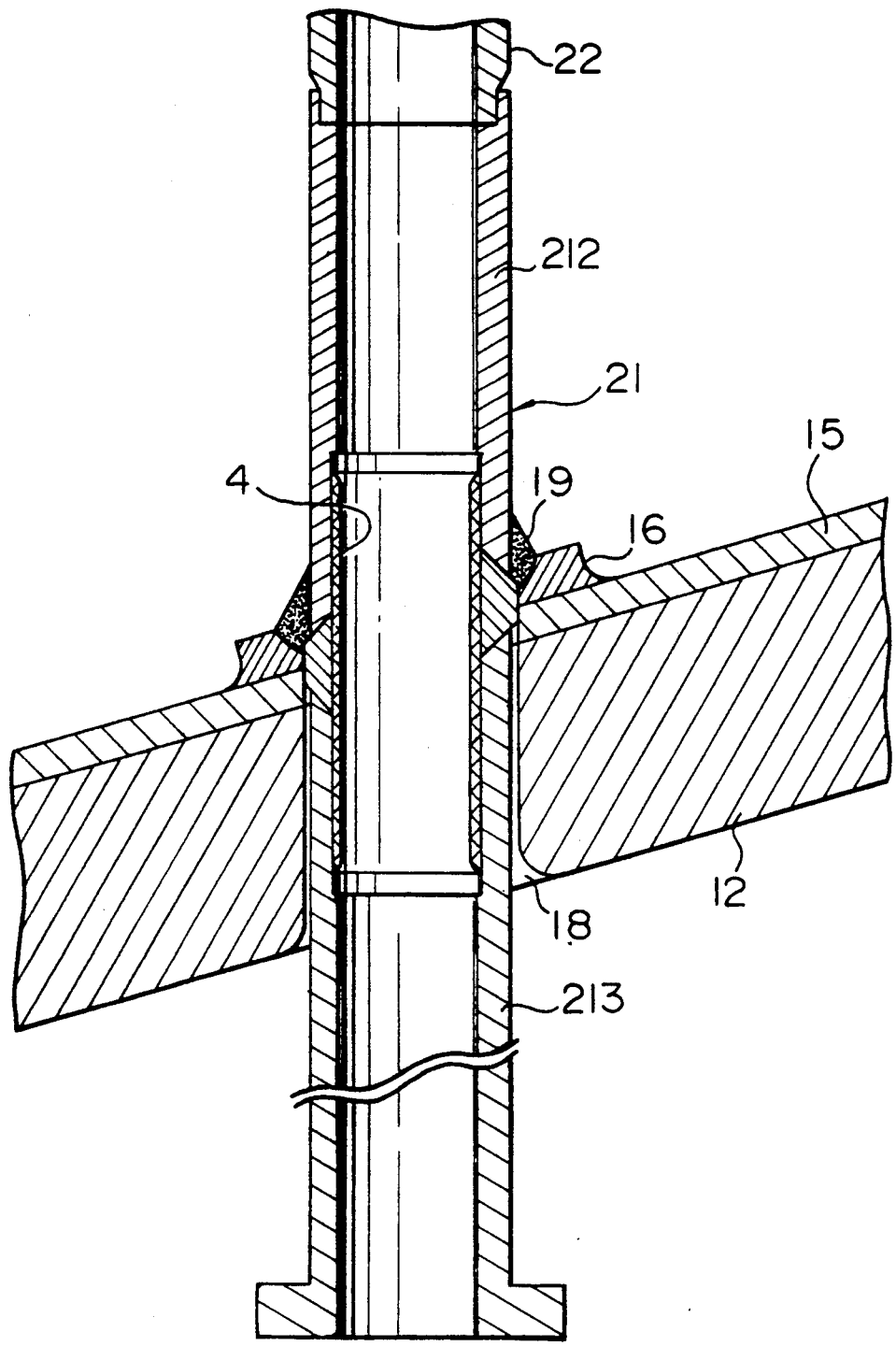
FIG. 1 is a fragmentary enlarged sectional view showing an ICM housing to which a repairing structure for stress corrosion cracking according to one embodiment of the present invention is applied.
Figure 2:
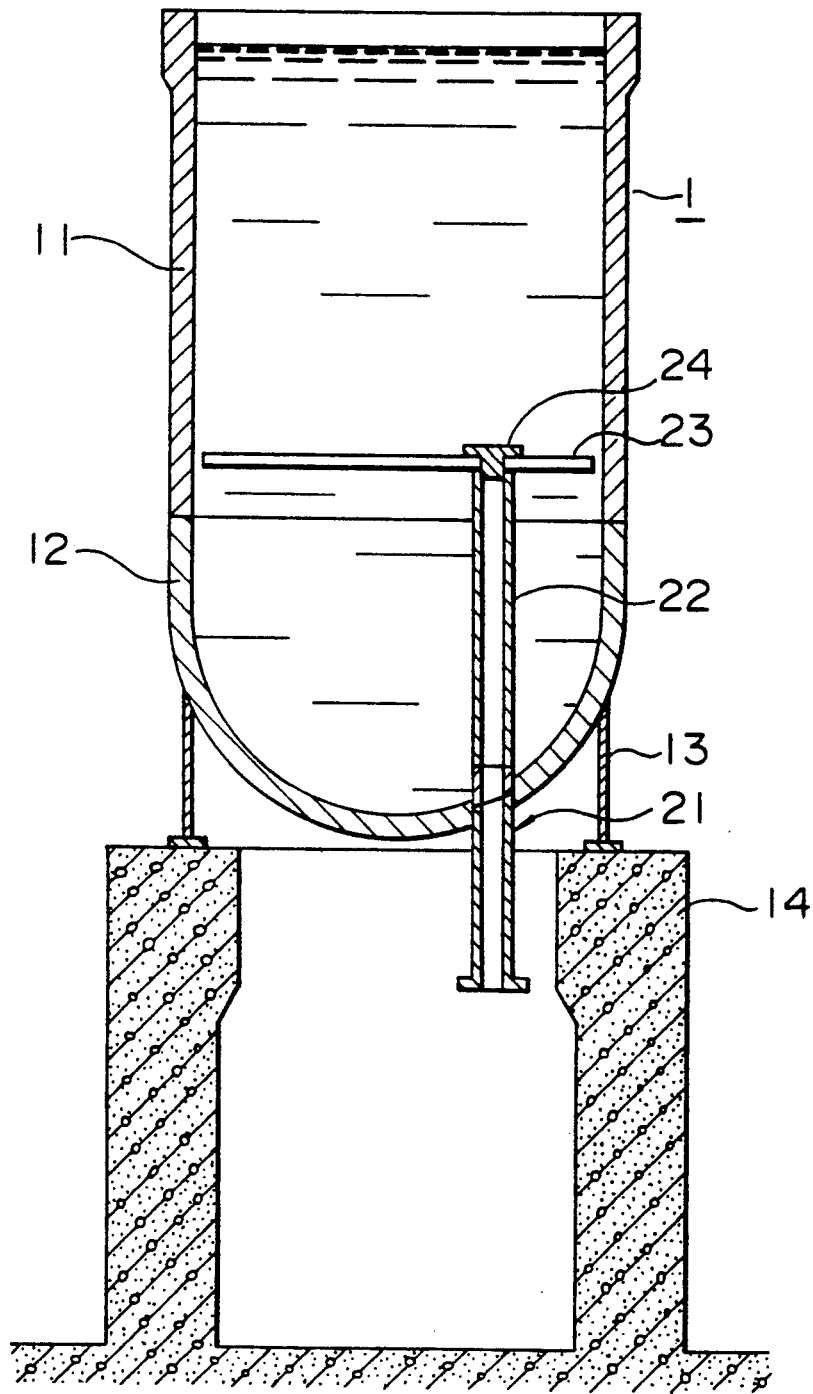
FIG. 2 is a sectional view of an RPV which employs the ICM housing of FIG. 1.

A repairing structure for stress corrosion cracking according to one embodiment of the present invention shown in FIG. 1 is applicable to an ICM housing provided in an RPV shown, for example FIG. 2.

An RPV 1 comprises, as shown in FIG. 2, a main body 11, a bottom head plate 12 fixed to one end of the main body 11, and a top head (not shown) fixed to the other end of the main body 11. A coolant is accommodated in the RPV 1. The RPV 1 is fixedly installed on a pedestal 14 of pressure containment vessel through a skirt 13. A plurality of ICM housings 21 extend through the bottom head plate 12 into the RPV 1. In the drawing, only a single ICM housing is illustrated.

As shown in FIG. 1, the bottom head plate 12 is provided on an inner peripheral surface thereof with a liner layer 15 of nickel-chromium alloy or inconel. A plurality of stub tubes 16 (only one of them is shown) are welded by buildup welding onto the linear layer 15 and separated from each other. Each ICM housing 21 extends through the bottom head plate 12, the linear layer 15 and the stub tube 16 into the RPV 1 with an annular space 18 around it. The ICM housing 21 is fixedly secured to the stub tube 16 through a weld 19. The ICM housing 21 is joined at one end thereof with one end of an ICM guide tube 22 and is usually closed at the other end thereof with a plug (not shown). The other end of the ICM guide tube 22 is joined to a opening formed in a core plate 23 disposed in the RPV 1.

Figure 3:
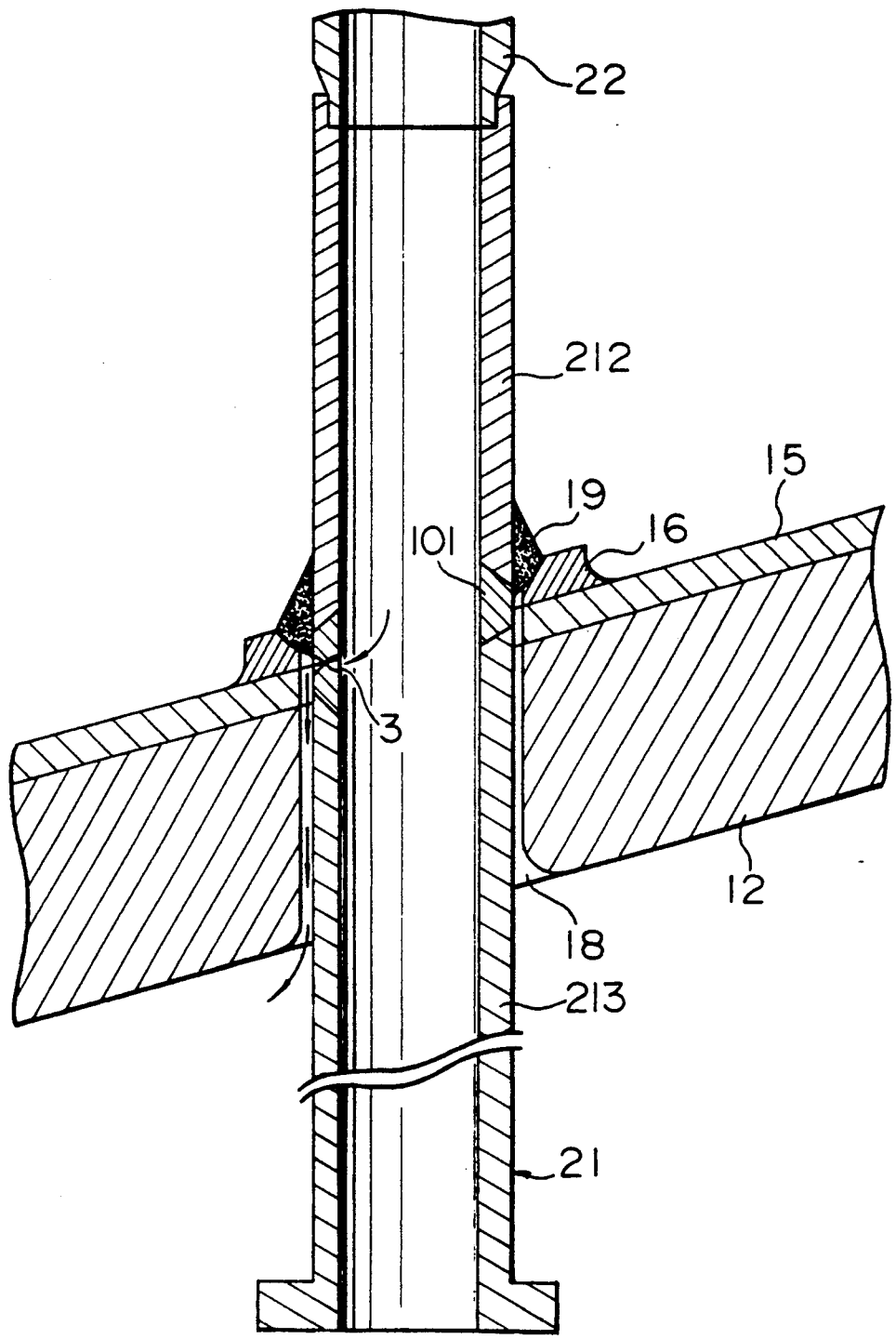
FIG. 3 is a fragmentary enlarged sectional view showing an ICM housing to which a conventional repairing structure is applied.

There is a possibility that in this type of construction a continuous cracking occurs in the weld of the ICM housing 21 due to the stress corrosion cracking. Therefore, as shown in FIG. 3, an ICM housing lower half including a part thereof in which the stress corrosion cracking occurs is usually cut and removed to replace it with a new ICM housing half 213. The new ICM housing half 213 is welded to the remaining housing half 212 through a weld 101. However, the weld which is in danger of stress corrosion cracking still remains, thereby providing a possibility of the occurrence of stress corrosion cracking. Once the cracking 3 occurs, the coolant leaks out of the RPV 1 through the cracking 3 and the annular space 18.

To prevent the above phenomenon, in the embodiment of FIG. 1, the ICM housing 21 is provided with a molten metal part 4 in an area in danger of stress corrosion cracking. The molten metal part 4 includes δ ferrite composition having a content of 4% or more.

Figure 4:
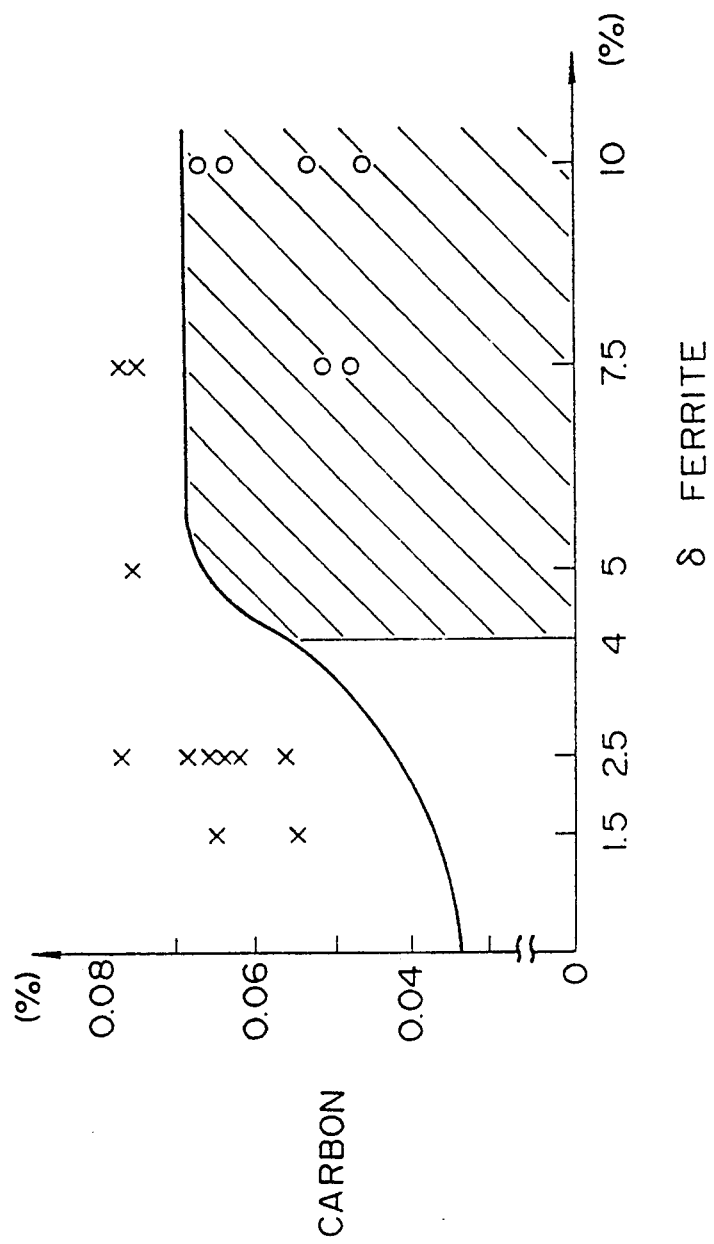
FIG. 4 is a graph showing the resistance to stress corrosion cracking.

In the graphical representation of experimental data in FIG. 4, an x represents a component combination in which a corrosion cracking occurs, while a circle represents a component combination in which no corrosion cracking has occurred. As apparent from FIG. 4, a combination of 0.06% or less carbon and 4% or more δ ferrite, namely, within a hatched area, can prevent the occurrence of corrosion cracking. The molten metal part 4 including 4% or more δ ferrite composition has a good resisting property against the stress corrosion cracking as compared with the pure ICM housing 21 because the carbon content of the pure ICM housing, i.e. TYPE 304 stainless steel is about 0.07%. Therefore, occurrence of continuous cracking is suppressed to a minimum so that there is very little possibility of leakage of the coolant.

Next, the process for the formation of the molten metal part 4 will be described with reference to FIGS. 2 and FIGS. 5 to 10.

As shown in FIG. 2, the other end of the ICM guide tube 22 is closed by a seal cap 24. Then, the plug is removed from the other end of the ICM housing 21 to discharge the coolant out of the ICM housing 21 and the ICM guide tube 22.

Figure 5:
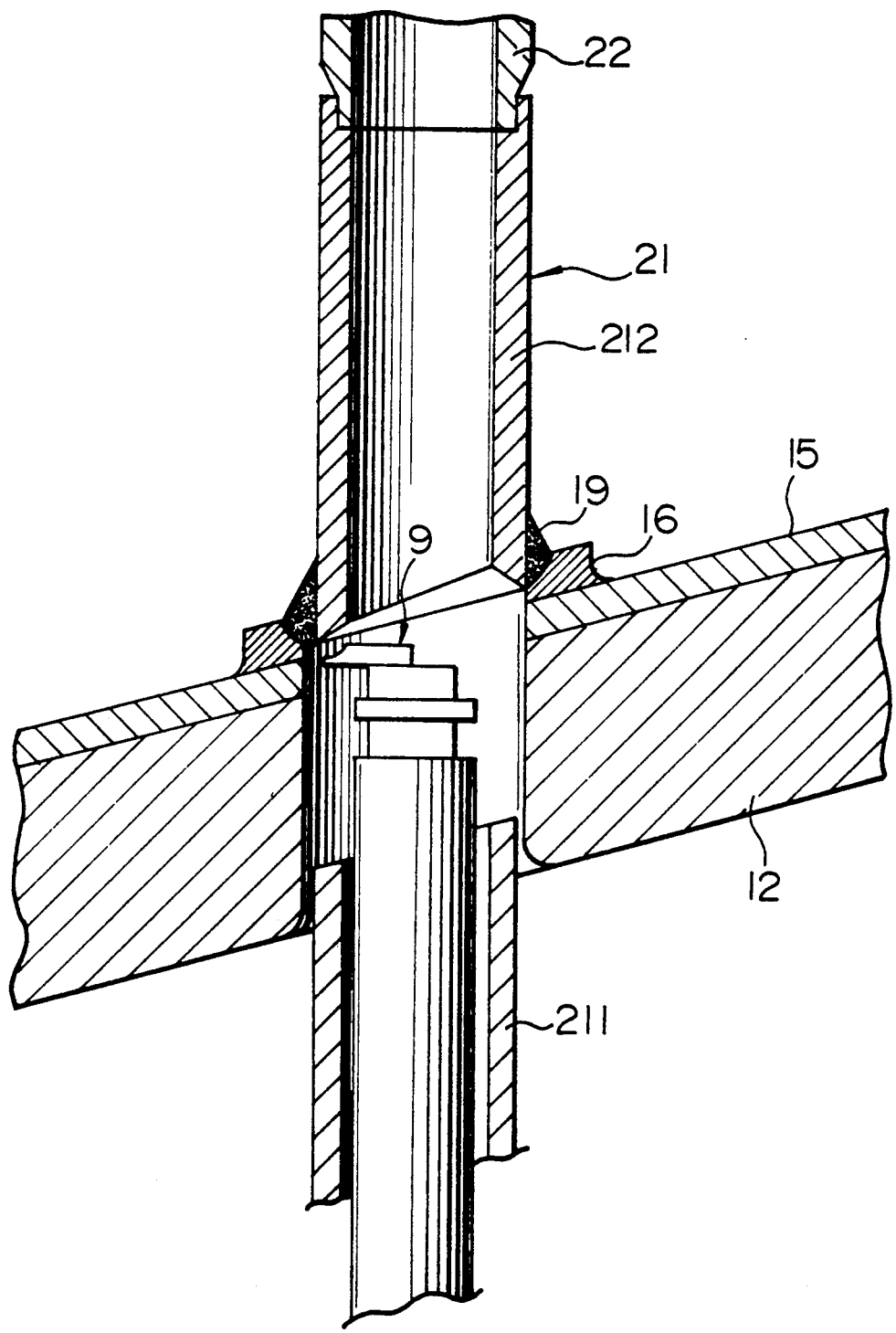
FIGS. 5 to 10 illustrate the procedure for the formation of the repairing structure for stress corrosion cracking according to the embodiment of the present invention.

As shown in FIG. 5, a remote-control cutting machine 9 is inserted into the ICM housing 21 through the other end thereof to cut a lower half 211 from the ICM housing 21, and then the ICM housing lower half 211 is removed. The cutting machine 9 further conducts an edge preparation against the cut end of the remaining upper half 212.

Figure 6:
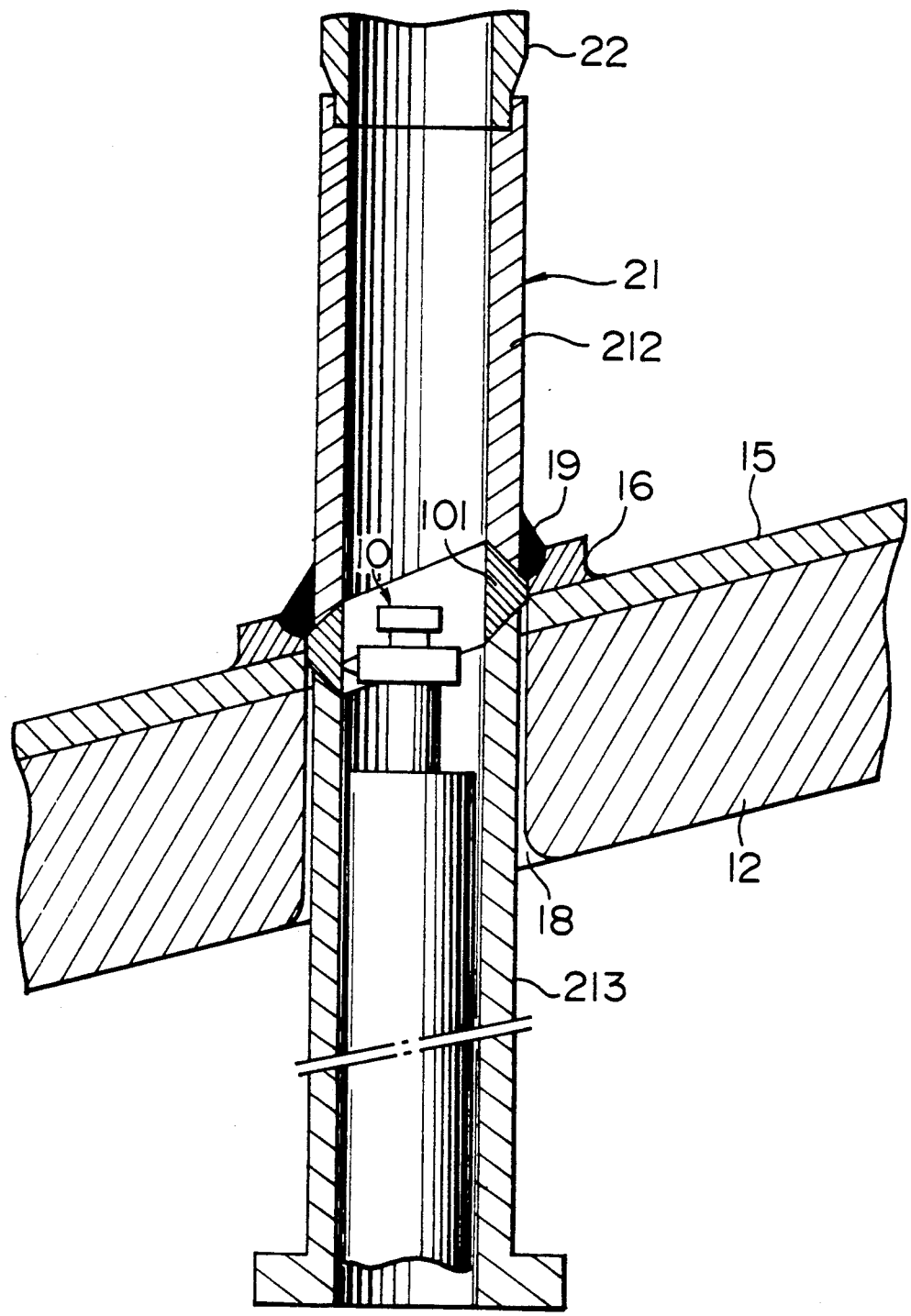

Subsequently, as shown in FIG. 6, a new ICM housing half 213 made of low-carbon stainless steel is inserted through the bottom head plate 12 so as to abut at one end thereof to the remaining upper housing half 212. A remote-control welder 10 is inserted through the other end of the housing half 213 so as to weld the cut end of the ICM housing half 212 and the other end of the ICM housing half 213 together into an ICM housing 21 through a weld 101.

Figure 7:
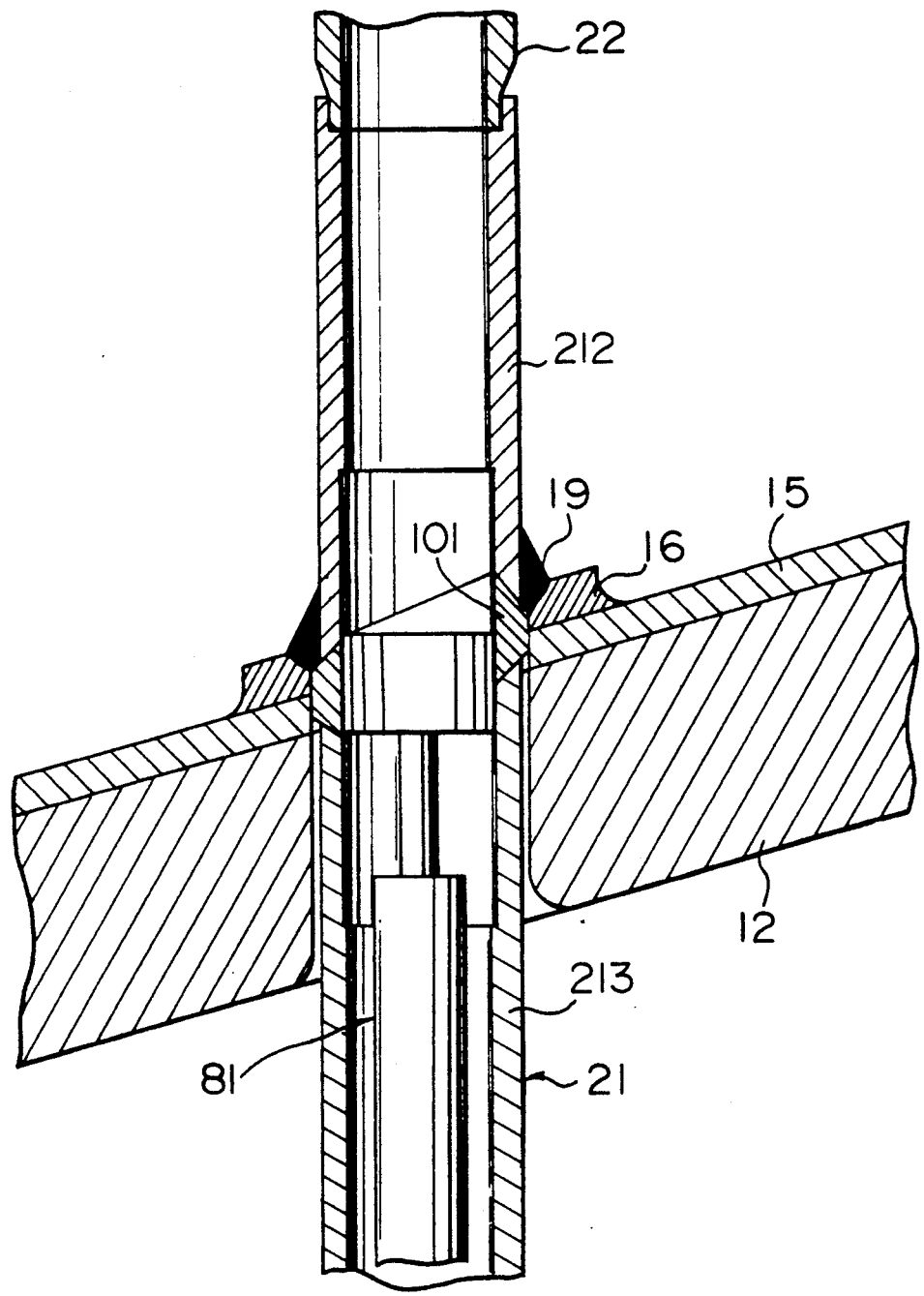

Further, as shown in FIG. 7, a remote-control inner surface working machine or grinder 81 is inserted into the ICM housing half 213 through the other end thereof so as to smooth the inner peripheral surfaces of the ICM housing halves 212 and 213 which are adjacent to the weld 101.

Figure 8:
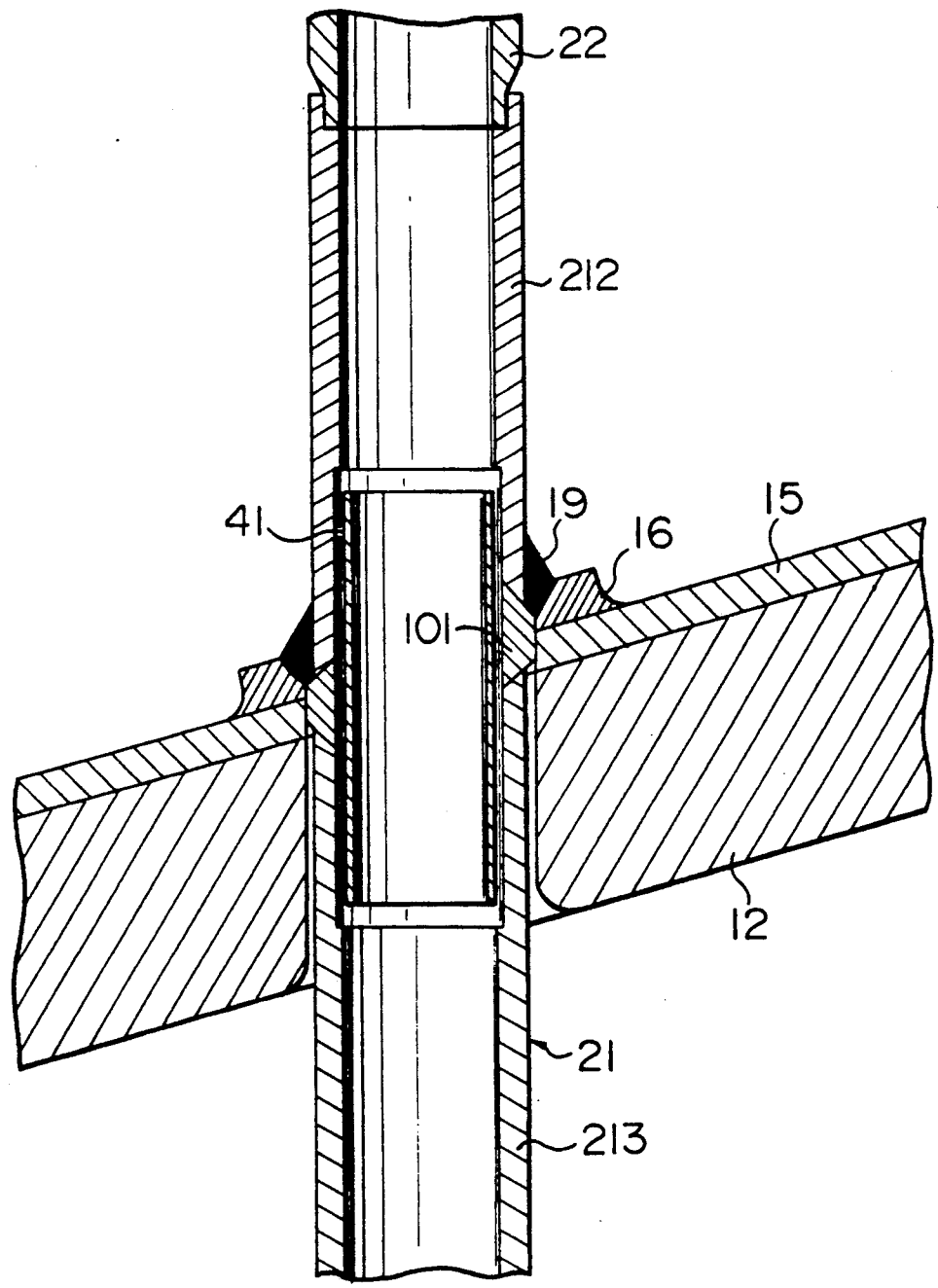

Thereafter, as shown in FIG. 8, a cylindrical sleeve 41 is set in position to the inner peripheral surface portion by an inserting jig (not shown). Since the inner peripheral surface portion is smoothed as mentioned before, the sleeve 41 can be easily inserted. When the sleeve 41 is applied to the ICM housing 21 of ordinary dimension, the thickness of the sleeve 41 is between 0.4 mm and 0.8 mm and, preferably, 0.6mm, to facilitate handling. Further, the sleeve 41 contains less than 0.03% carbon from the viewpoint of the corrosion resistance and, in addition, contains chromium and nickel by amounts equivalent to those required to produce 4% or more δ ferrite composition when molten and mixed with the base metal TYPE 304 stainless steel. The sleeve 41 is made of a material containing the following components, such as TYPE 316 stainless steel. It is noted that the unit is weight percent.

| C | Si | Mn | P | S | Ni | Cr | Mo |
|---|---|---|---|---|---|---|---|
| ~0.03 | ~1.00 | ~2.00 | ~0.045 | ~0.030 | 12.00~15.00 | 16.00~18.00 | 2.00~3.00 |

Figure 9:
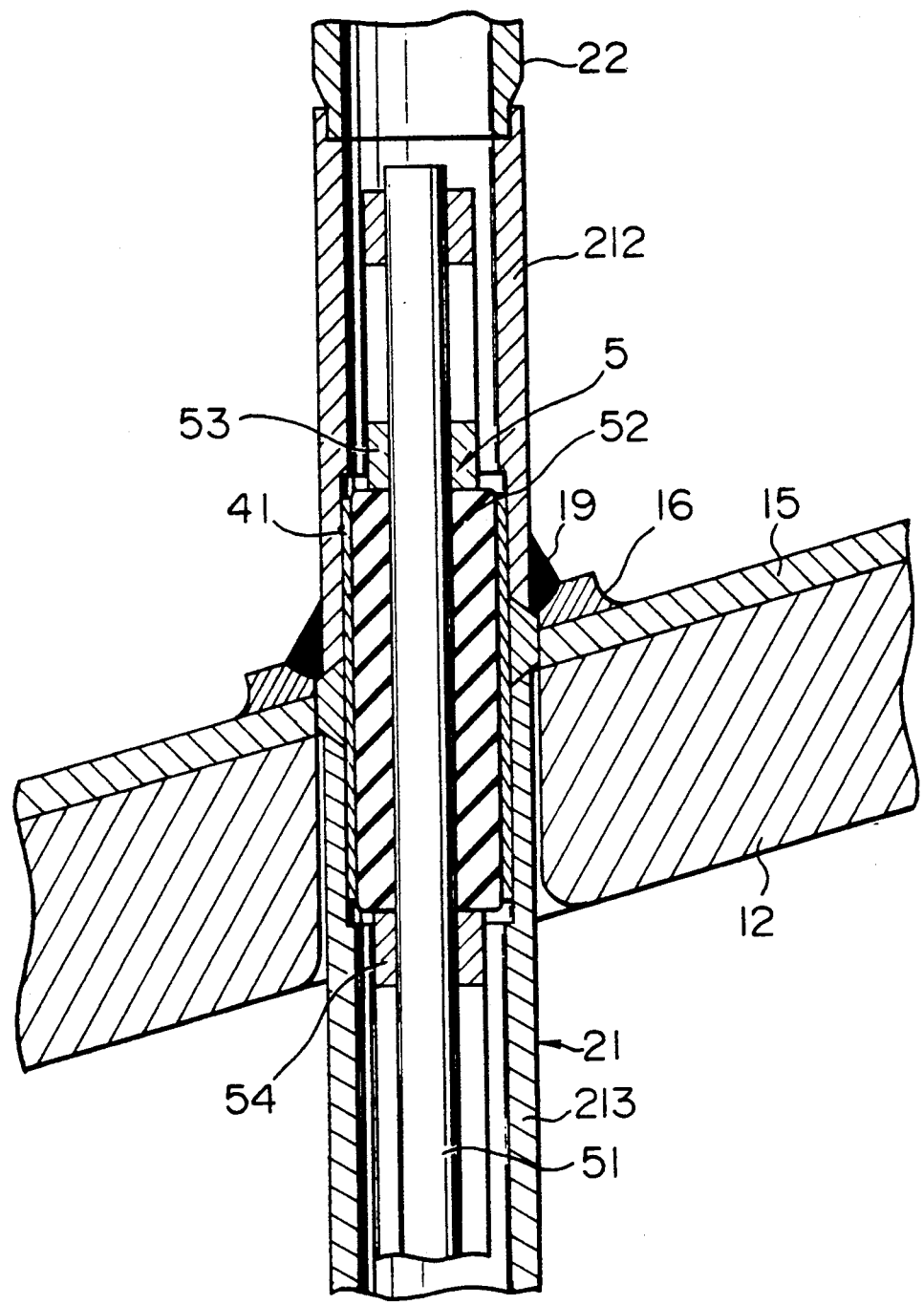

As shown in FIG. 9, an expander 5 is inserted into the ICM housing 21. The expander 5 comprises a stem 51, a rubber tube 52 fitted around the stem 51, and a pair of axially movable pistons 53 and 54 serving to hold the tube 52 therebetween. As the tube 52 is positioned in alignment with the sleeve 41, the pair of pistons 53 and 54 are moved to close to each other so that the rubber tube 52 is axially compressed and radially expanded. As a result, the sleeve 41 is plastically deformed to be uniformly press-fitted to the inner peripheral surface portion 211 of the ICM housing 21 over the entire surface of the sleeve 41.

Figure 10:
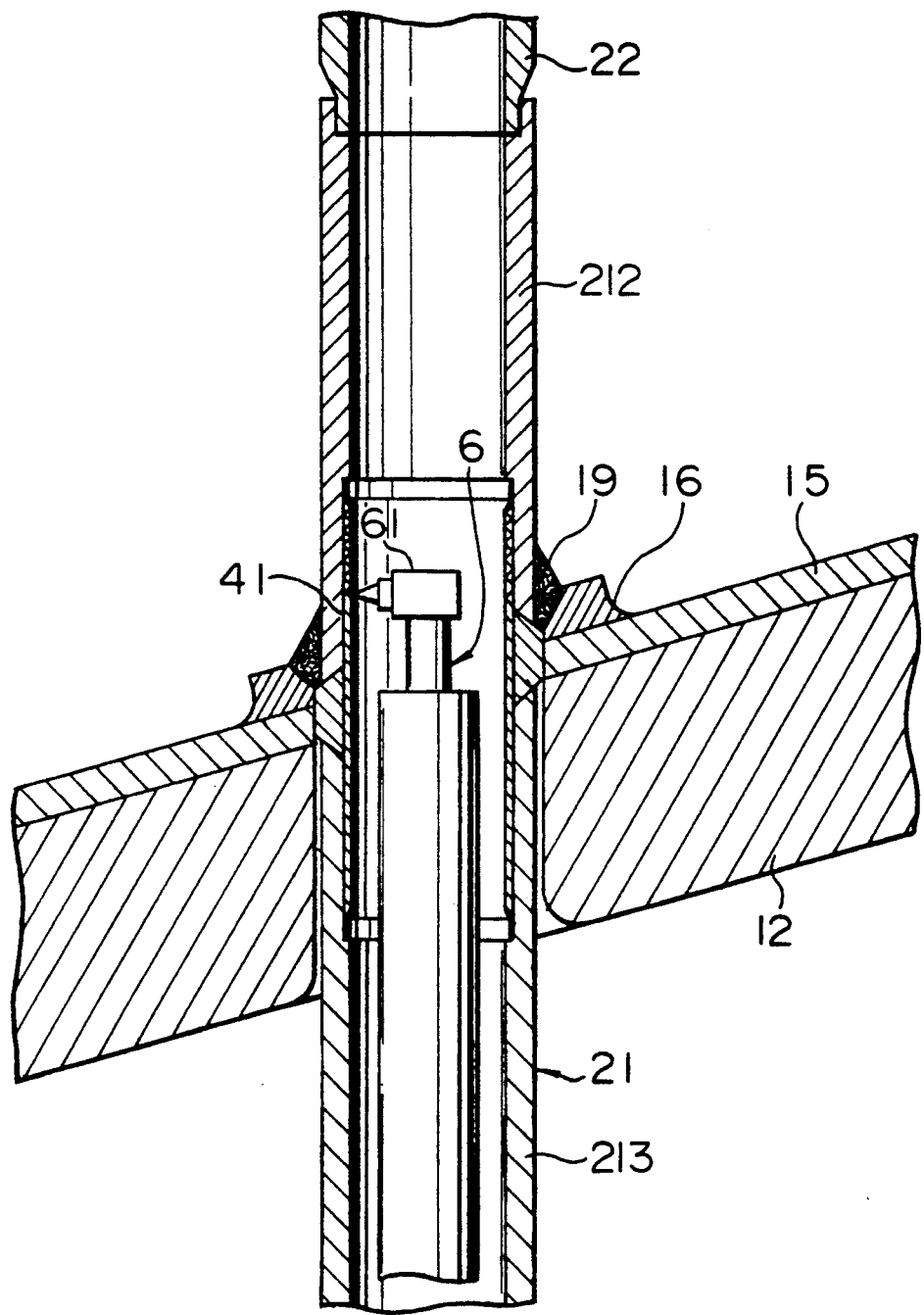

Finally, as shown in FIG. 10, a head 61 of a remote-control non-filler type tungsten inert gas arc welder or a TIG welder 6 is inserted into the ICM housing half 213 through the other end thereof. The head 61 is rotated and moved along the entire axial length of the sleeve 41 to melt the sleeve 41 throughout. In this case, axially opposite ends of the sleeve 41 are molten with low heat input for the purpose of preventing sensitization due to thermal effect. Since the sleeve 41 has, to a certain extent, already been plastically deformed, the sleeve is deformed very little in the welding operation, thus contributing to a good melting performance.

Consequently, the sleeve 41 and a portion of the inner surface of the ICM housing 21 (ICM housing halves 212 and 213) are molten together to form on the inner surface of the ICM housing 21 with the molten metal part 4 including 4% or more δ ferrite composition and having a good resistance against stress corrosion cracking. Results of metal component analysis of the molten metal part 4 formed in accordance with the present embodiment in which the welding heat input is 3.1 KJ/cm and the pitch of axial movement of a torch is 1.5 mm are as follows. It is noted that the point of measurement is located 0.5 mm radially outward from the inner peripheral surface and the unit is weight percent.

| C | Si | Mn | Ni | Cr | Mo | δ-ferrite |
|---|---|---|---|---|---|---|
| 0.020 | 0.38 | 1.36 | 12.49 | 18.74 | 106 | 4.9 |

TIG welding is used for melting the sleeve 41 in the present embodiment, however, other welding methods or a laser can be used as well. In the present embodiment, welding of the sleeve or heating thereof is conducted with cooling the ICM housing 21 from the outside thereof by coolant, namely, a heat sink welding is conducted. With such a welding, the residual stress in the ICM housing 21 is suppressed and sensitization of the sleeve 41 is also suppressed, thereby obtaining a higher resistance against the stress corrosion cracking.

It is easily understood that the above procedure is applicable to the CRD housing as well.

What is claimed is:

1. A method for repairing an elongated metal hollow member welded to a wall of a pressure vessel of a nuclear reactor and extending into a coolant within said pressure vessel, the method comprising the steps of:

removing said coolant from said hollow member;

cutting and removing a defective portion of said hollow member;

replacing the removed defective portion of said hollow member with a new hollow element;

welding the new hollow element with a remaining part of said hollow member so as to form a hollow member consisting of the remaining part of the hollow member and the new hollow element;

smoothing an inner peripheral surface of a wall portion of said new hollow member including a weld formed by said welding;

locating a stainless steel sleeve on said inner peripheral surface of said wall portion in a coaxial relationship;

fitting said sleeve onto said inner peripheral surface of said wall portion along an entire length of said sleeve; and heating said sleeve throughout so as to produce a molten metal portion including 4% or more by wt of δ ferrite penetrating into both said wall portion and said sleeve.

2. A method according to claim 1, wherein the step of heating is conducted by an electric arc welding machine.

3. A method according to claim 2, wherein the step of heating is conducted by heat sink welding.

4. A method according to claim 1, wherein the step of heating is carried out while cooling said wall portion.

5. A method according to claim 4, wherein said cooling is carried out by coolant within said pressure vessel.

6. A method according to claim 2, wherein the step of heating is conducted using a non-filler tungsten inert gas welding machine.

7. A method according to claim 1, wherein the step of fitting includes radially outwardly expending said sleeve.

8. A repaired elongated metal hollow member welded to a wall of a pressure vessel of a nuclear reactor and extending into a coolant within said pressure vessel, said metal hollow member including an original portion of the metal hollow member and a repairing hollow member portion, a stainless steel sleeve fitted to inner peripheral surfaces of said original portion of said metal hollow member and said repairing hollow member portion, a molten metal portion including 4% or more by wt of δ ferrite formed at a portion of the inner peripheral surfaces of the original portion of said metal hollow member and said repairing hollow member portion so as to form a new hollow member by a weld, and wherein, at said weld, said molten metal portion penetrates into both a well portion of said new hollow member and said sleeve.

* * * * *